Patented Apr. 13, 1937

2,076,607

UNITED STATES PATENT OFFICE

2,076,607

PROCESS FOR COLOR REMOVAL

John C. Woodhouse, Cragmere, Del., assignor to E. I. du Pont de Nemours & Company, Wilmington, Del., a corporation of Delaware No Drawing. Application October 27, 1934, Serial No. 750,281

16 Claims. (Cl. 260—134)

This invention is a continuation in part of my copending application U. S. Ser. No. 648,983 and relates to the removal of color and aldehyde from ketone-aldehyde-hydrocarbon-containing mixtures and more particularly to the removal of color and aldehyde from the ketone-aldehyde-hydrocarbon-containing mixtures which may be separated from the higher alcohols-containing mixtures or fractions thereof, boiling above methanol, obtainable by the catalytic hydrogenation of oxide of carbon under pressure.

In the production of methanol by catalytic reaction of oxide of carbon and hydrogen under pressure it is known that there is also obtained a higher alcohol-containing mixture boiling above methanol. The methanol which is produced and the higher alcohols which are obtained by this high pressure hydrogenation both have valuable and differing uses after their separation one from the other.

The methanol may be separated from the crude higher alcohols-containing mixture by distillation, but the methanol distilled, I have found, contains a mixture of ketones, aldehydes and hydrocarbons.

This methanol may be separated in turn from the mixture of ketones, aldehydes and hydrocarbons by combined water scrubbing and distillation, but I have found that the mixture as separated from the methanol is undesirably colored and has an aldehyde content which militates against its commercial use, such, for example, as an alcohol denaturant for which it is otherwise admirably suited.

It is an object of this invention to overcome the disadvantages of the ketone-aldehyde-hydrocarbon-containing mixture previously described and to provide a new and improved process for removal of color and aldehyde therefrom.

Other objects and advantages of this invention will be apparent by reference to the following specification wherein its details and preferred embodiments are described.

According to the present invention the ketone-aldehyde-hydrocarbon-containing mixture, boiling from about 75–230° C. and higher, which in turn is included in the higher alcohols-methanol-containing mixture obtainable by the catalytic hydrogenation of oxide of carbon under pressure, or fractions thereof, is subjected to treatment with an alkali metal. At the expiration of the alkali metal treament the liquid may be decanted from unreacted metal and distilled, and practically colorless and substantially aldehyde-free product obtained.

Although the proportions and methods utilized and the conditions followed may vary over a wide range, the following examples will serve to illustrate the preferred procedure according to my invention.

*Example 1.*—Metallic sodium, in the amount of 0.75 gram, was added to 150 cc. of an orange colored ketone-aldehyde-hydrocarbon-containing mixture, boiling in the range between 75–135° C., and obtained by combined distillation and water scrubbing from the methanol-containing mixture previously distilled from the product resulting from the catalytic hydrogenation of oxide of carbon under pressure. The material was vacuum distilled at 100 m.m. mercury in contact with the sodium at a temperature of 80° C., for a period of two hours under reflux. At the expiration of the treatment period a colorless product was obtained. Tests on this material show that the aldehyde content of the original mixture had been reduced from a percentage (calculated as isobutyraldehyde) of about 27 (aldehyde number, 20) to a percentage of approximately 4 (aldehyde number, 3).

*Example 2.*—Metallic sodium in the amount of 1.5 grams was added to 150 cc. of an orange colored ketone-aldehyde-hydrocarbon mixture, boiling in the range 75–135° C., and obtained, as described in Example 1, by distillation from the product resulting from the catalytic hydrogenation of oxide of carbon under pressure. Under conditions as described in Example 1 the material was vacuum distilled in contact with the sodium for a period of two hours under reflux. A colorless product was obtained. Tests on this material show that by the treatment above described the aldehyde content has been reduced, calculated as isobutyraldehyde, from a percentage of about 27 (aldehyde number 20) to 0.27 (aldehyde number 0.2).

It will be understood that a treatment such as described in the example, i. e. distillation of the material in presence of alkali metal could be replaced by a method in which distillation is carried out after decantation from alkali metal and/or the alcoholate or the like formed, after having been standing in contact therewith.

It will also be understood that notwithstanding the fact that in the examples allusion has been made specifically to the use of metallic sodium as decolorizing agent, that the other alkali metals, for example, lithium, rubidium, caesium, and potassium, and condensing agents in general such as aluminum chloride, zinc chloride, and the like are also commercially advantageously used as color removing agents according to the above described procedure.

Various changes may be made in the details and methods of the invention without departing therefrom or sacrificing any of the advantages thereof.

I claim:

1. A process for the removal of color and aldehyde from the substantially alcohol-free ketone-aldehyde-hydrocarbon-containing mixture, included in but which has been removed from the higher alcohols-containing mixture which is in turn obtained by the catalytic hydrogenation of oxides of carbon under pressure, which comprises treating said ketone-aldehyde-hydrocarbon-containing mixture with alkali metal.

2. A process for the removal of color and aldehyde from the substantially alcohol-free ketone-aldehyde-hydrocarbon-containing mixture, included in but which has been removed from the higher alcohols-containing mixture which is in turn obtained by the catalytic hydrogenation of oxides of carbon under pressure, which comprises treating said ketone-aldehyde-hydrocarbon-containing mixture with metallic sodium.

3. A process for the removal of color and aldehyde from the substantially alcohol-free ketone-aldehyde-hydrocarbon-containing mixture, included in but which has been removed from the higher alcohols-containing mixture which is in turn obtained by the catalytic hydrogenation of oxides of carbon under pressure, which comprises treating said ketone-aldehyde-hydrocarbon-containing mixture with metallic potassium.

4. A process for the removal of color and aldehyde from the substantially alcohol-free ketone-aldehyde-hydrocarbon-containing mixture, included in but which has been removed from the higher alcohols-containing mixture which is in turn obtained by the catalytic hydrogenation of oxides of carbon under pressure, which comprises treating said ketone-aldehyde-hydrocarbon-containing mixture with metallic lithium.

5. A process for the removal of color and aldehyde from the substantially alcohol-free ketone-aldehyde-hydrocarbon-containing mixture, boiling in the range of about 75–230° C., included in but which has been removed from the higher alcohols-containing mixture which is in turn obtained by the catalytic hydrogenation of oxides of carbon under pressure, which comprises treating said ketone-aldehyde-hydrocarbon-containing mixture with alkali metal.

6. A process for the removal of color and aldehyde from the substantially alcohol-free ketone-aldehyde-hydrocarbon-containing mixture, boiling in the range of about 75–230° C., included in but which has been removed from the higher alcohols-containing mixture which is in turn obtained by the catalytic hydrogenation of oxides of carbon under pressure, which comprises treating said ketone-aldehyde-hydrocarbon-containing mixture with metallic sodium.

7. A process for the removal of color and aldehyde from the substantially alcohol-free ketone-aldehyde-hydrocarbon-containing mixture, boiling in the range of about 75–230° C., included in but which has been removed from the higher alcohols-containing mixture which is in turn obtained by the catalytic hydrogenation of oxides of carbon under pressure, which comprises treating said ketone-aldehyde-hydrocarbon-containing mixture with metallic potassium.

8. A process for the removal of color and aldehyde from the substantially alcohol-free ketone-aldehyde-hydrocarbon-containing mixture, boiling in the range of about 75–230° C., included in but which has been removed from the higher alcohols-containing mixture which is in turn obtained by the catalytic hydrogenation of oxides of carbon under pressure, which comprises treating said ketone-aldehyde-hydrocarbon-containing mixture with metallic lithium.

9. A process for the removal of color and aldehyde from the substantially alcohol-free ketone-aldehyde-hydrocarbon-containing mixture, boiling in the range of about 75–135° C., included in but which has been removed from the higher alcohols-containing mixture which is in turn obtained by the catalytic hydrogenation of oxides of carbon under pressure, which comprises treating said ketone-aldehyde-hydrocarbon-containing mixture with alkali metal.

10. A process for the removal of color and aldehyde from the substantially alcohol-free ketone-aldehyde-hydrocarbon-containing mixture, boiling in the range of about 75–135° C., included in but which has been removed from the higher alcohols-containing mixture which is in turn obtained by the catalytic hydrogenation of oxides of carbon under pressure, which comprises treating said ketone-aldehyde-hydrocarbon-containing mixture with metallic sodium.

11. A process for the removal of color and aldehyde from the substantially alcohol-free ketone-aldehyde-hydrocarbon-containing mixture, boiling in the range of about 75–135° C., included in but which has been removed from the higher alcohols-containing mixture which is in turn obtained by the catalytic hydrogenation of oxides of carbon under pressure, which comprises treating said ketone-aldehyde-hydrocarbon-containing mixture with metallic potassium.

12. A process for the removal of color and aldehyde from the substantially alcohol-free ketone-aldehyde-hydrocarbon-containing mixture, boiling in the range of about 75–135° C., included in but which has been removed from the higher alcohols-containing mixture which is in turn obtained by the catalytic hydrogenation of oxides of carbon under pressure, which comprises treating said ketone-aldehyde-hydrocarbon-containing mixture with metallic lithium.

13. A process for the removal of color and aldehyde from the substantially alcohol-free ketone-aldehyde-hydrocarbon-containing mixture, included in but which has been removed from the higher alcohols-containing mixture which is in turn obtained by the catalytic hydrogenation of oxides of carbon under pressure, which comprises heating said ketone-aldehyde-hydrocarbon-containing mixture in contact with alkali metal.

14. A process for the removal of color and aldehyde from the substantially alcohol-free ketone-aldehyde-hydrocarbon-containing mixture, included in but which has been removed from the higher alcohols-containing mixture which is in turn obtained by the catalytic hydrogenation of oxides of carbon under pressure, which comprises heating said ketone-aldehyde-hydrocarbon-containing mixture in contact with metallic sodium.

15. A process for the removal of color and aldehyde from the substantially alcohol-free ketone-aldehyde-hydrocarbon-containing mixture, boiling in the range of about 75–135° C., included in but which has been removed from the higher alcohols-containing mixture which is in turn obtained by the catalytic hydrogenation of oxides of carbon under pressure, which comprises heating said ketone-aldehyde-hydrocarbon-containing mixture in contact with alkali metal.

16. A process for the removal of color and aldehyde from the substantially alcohol-free ketone-aldehyde-hydrocarbon-containing mixture, boiling in the range of about 75–135° C., included in but which has been removed from the higher alcohols-containing mixture which is in turn obtained by the catalytic hydrogenation of oxides of carbon under pressure, which comprises heating said ketone-aldehyde - hydrocarbon - containing mixture in contact with metallic sodium.

JOHN C. WOODHOUSE.